(12) United States Patent
Mandava et al.

(10) Patent No.: US 10,289,409 B2
(45) Date of Patent: May 14, 2019

(54) SYSTEMS, METHODS, AND APPARATUS FOR MIGRATING CODE TO A TARGET ENVIRONMENT

(71) Applicant: The Travelers Indemnity Company, Hartford, CT (US)

(72) Inventors: Ramana Mandava, Farmington, CT (US); Ravi K. Challa, Ellington, CT (US); Ajay C. Srinivasulu, Hartford, CT (US); Gary S. McKearney, Jr., Brooklyn, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 15/472,719

(22) Filed: Mar. 29, 2017

(65) Prior Publication Data

US 2018/0285099 A1    Oct. 4, 2018

(51) Int. Cl.
*G06F 8/71*        (2018.01)
*G06F 11/36*       (2006.01)

(52) U.S. Cl.
CPC ............ *G06F 8/71* (2013.01); *G06F 11/3668* (2013.01)

(58) Field of Classification Search
CPC ................................ G06F 8/71; G06F 11/3668
See application file for complete search history.

(56) References Cited

U.S. PATENT DOCUMENTS

| | | | | |
|---|---|---|---|---|
| 6,536,037 B1 * | 3/2003 | Guheen | ...................... | G06F 8/71 703/2 |
| 6,986,134 B1 * | 1/2006 | Foster | ....................... | G06F 8/61 717/177 |
| 8,434,053 B2 * | 4/2013 | Palmieri | .................. | G06F 8/61 705/317 |
| 8,505,005 B1 * | 8/2013 | Bos | ........................... | G06F 8/61 717/177 |
| 8,943,470 B2 | 1/2015 | Behr et al. | | |
| 8,997,091 B1 | 3/2015 | Watson et al. | | |
| 9,032,373 B1 | 5/2015 | Gupta | | |
| 9,111,030 B1 | 8/2015 | Dunn et al. | | |
| 9,208,062 B1 | 12/2015 | Arguelles | | |
| 9,383,976 B1 * | 7/2016 | Singh | ........................ | G06F 8/34 |
| 9,405,523 B2 * | 8/2016 | Choi | ......................... | G06F 8/71 |

(Continued)

FOREIGN PATENT DOCUMENTS

WO    WO2018159997    9/2018

OTHER PUBLICATIONS

Office Action for U.S. Appl. No. 15/472,825 dated Sep. 21, 2018; 16 pps.

(Continued)

*Primary Examiner* — Jae U Jeon
*Assistant Examiner* — Douglas M Slachta
(74) *Attorney, Agent, or Firm* — Michael D. Downs; Fincham Downs LLC

(57) ABSTRACT

Systems, apparatus, methods, and articles of manufacture provide for managing code migration to a target code environment. In one example implementation, after determining that source code is eligible for express migration from a first code environment to a second code environment, a code project package is automatically transmitted from a first code environment server to a second code environment server associated with the second code environment, without requiring user intervention.

12 Claims, 5 Drawing Sheets

(56) References Cited

U.S. PATENT DOCUMENTS

| | | |
|---|---|---|
| 9,830,148 B1 | 11/2017 | Mo |
| 9,916,233 B1 | 3/2018 | Qureshi |
| 2003/0037314 A1 | 2/2003 | Apuzzo |
| 2003/0046681 A1* | 3/2003 | Barturen .................. G06F 8/71 717/177 |
| 2003/0172368 A1 | 9/2003 | Alumbaugh et al. |
| 2003/0192029 A1* | 10/2003 | Hughes .................... G06F 8/20 717/101 |
| 2004/0068715 A1* | 4/2004 | Wong .................... G06F 9/4862 717/136 |
| 2006/0277158 A1 | 12/2006 | Kim |
| 2007/0180490 A1 | 8/2007 | Renzi et al. |
| 2007/0220479 A1* | 9/2007 | Hughes .................... G06F 8/00 717/100 |
| 2007/0240102 A1 | 10/2007 | Bello |
| 2007/0288107 A1* | 12/2007 | Fernandez-Ivern .... G06Q 10/00 700/91 |
| 2008/0126880 A1 | 5/2008 | Hegarty et al. |
| 2008/0295085 A1 | 11/2008 | Rachamadugu et al. |
| 2009/0070734 A1 | 3/2009 | Dixon et al. |
| 2009/0138855 A1 | 5/2009 | Huene et al. |
| 2010/0058294 A1* | 3/2010 | Best .......................... G06F 8/71 717/122 |
| 2010/0162217 A1 | 6/2010 | Morrison |
| 2011/0191770 A1* | 8/2011 | Inoue ...................... G06F 9/445 717/178 |
| 2011/0209121 A1 | 8/2011 | Nagata et al. |
| 2011/0283270 A1 | 11/2011 | Gass et al. |
| 2011/0296386 A1* | 12/2011 | Woollen .................. G06F 8/70 717/124 |
| 2012/0131567 A1* | 5/2012 | Barros .................. G06F 9/5088 717/170 |
| 2012/0246170 A1 | 9/2012 | Iantorno |
| 2012/0297361 A1* | 11/2012 | Dotan ...................... G06F 8/71 717/110 |
| 2013/0174117 A1 | 7/2013 | Watters |
| 2013/0174121 A1 | 7/2013 | Pindrik |
| 2014/0181793 A1 | 6/2014 | Kaliappan |
| 2014/0282433 A1 | 9/2014 | Eilam |
| 2016/0004517 A1 | 1/2016 | Salary |
| 2016/0087854 A1 | 3/2016 | Jayanti Venkata et al. |
| 2016/0210224 A1 | 7/2016 | Cohen et al. |
| 2016/0283360 A1 | 9/2016 | Allen et al. |
| 2016/0379281 A1 | 12/2016 | Laxmanan et al. |
| 2017/0075790 A1 | 3/2017 | Macleod et al. |
| 2017/0123951 A1 | 5/2017 | Abdirashid et al. |
| 2017/0147481 A1 | 5/2017 | Doss |
| 2017/0220458 A1 | 8/2017 | Finger et al. |
| 2017/0235553 A1 | 8/2017 | Dow et al. |
| 2017/0351506 A1 | 12/2017 | Celikyilmaz |
| 2018/0032706 A1 | 2/2018 | Fox |
| 2018/0060460 A1 | 3/2018 | Zhang et al. |
| 2018/0095866 A1 | 4/2018 | Narayanan et al. |
| 2018/0150377 A1 | 5/2018 | Oberle |
| 2018/0181483 A1 | 6/2018 | Oberle |
| 2018/0182049 A1 | 6/2018 | Oberle |
| 2018/0285099 A1 | 10/2018 | Mandava et al. |
| 2018/0285247 A1 | 10/2018 | Gandhi |

OTHER PUBLICATIONS

Bryant, "Stop Being Lazy, and Test Your Software (with the Help of Docker)", Nov. 2015, InfoQ.com, retrieved from: https://www.infoq.com/news/2015/11 /testing-software-docker.

Farcic, "Continuous Deployment with Containers", Apr. 2016, InfoQ.com, retrieved from: https://www.infoq.com/articles/continuous-deployment-containers.

Ankerholz, "Testing the Right Things with Docker", Sep. 2016, Linux.com, retrieved from: https://www.linux.com/news/testing-right-things-docker.

Notice of Allowance for U.S. Appl. No. 16/024,098 dated Jan. 29, 2019; 14 pps.

* cited by examiner

SYSTEMS, METHODS, AND APPARATUS FOR MIGRATING CODE TO A TARGET ENVIRONMENT

FIELD OF THE INVENTION

The present invention relates generally to systems for maintaining applications and other software, and more particularly to improvements in systems for migrating software from one environment to another (e.g., from a development environment to a production environment).

BACKGROUND OF THE INVENTION

Prior art tools are known for migrating software from a specific source environment to a specific target environment, such as from a development environment to a software testing environment to identify any defects. Such tools are generally not optimized for migration of software within a short time frame, as they typically require significant manual involvement at various points, duplicate code repositories, redundant code packaging mechanisms, and human decision making. As a result, they cannot be easily or efficiently scaled to accommodate larger development teams or the concurrent development and testing of large numbers of code projects. The drawbacks of the prior art systems lead to delays, slower migrations, inefficient use of computing resources, and nonproductive waiting time for software developers and quality assurance professionals.

SUMMARY OF THE INVENTION

According to embodiments of the present invention, systems, methods, apparatus, articles of manufacture, and/or computer readable media (e.g., a non-transitory computer readable memory storing instructions for directing a processor of a code migration controller device) provide a process for migration of software from a first code environment to one or more target code environments, such as from an application development environment to a testing environment, or from a testing environment to a production environment. In some embodiments, the process for migration of software comprises the following steps:
  a) receiving source code associated with a code project;
  b) packaging the source code to create a code project package;
  c) storing the code project package on a first code environment server (e.g., automatically, without requiring user intervention to copy the code project package from one repository to another); and
  d) transmitting the code project package from the first code environment server to a second code environment server associated with the second code environment (e.g., automatically, without requiring user intervention to copy the code project package from one repository to another).

According to embodiments of the present invention, systems, methods, apparatus, articles of manufacture, and/or computer readable media (e.g., a non-transitory computer readable memory storing instructions for directing a processor of a code migration controller device) provide a process for migration of software from a first code environment to one or more target code environments, such as from an application development environment to a testing environment, or from a testing environment to a production environment. In some embodiments, the process for migration of software comprises the following steps:
  a) receiving source code associated with a code project;
  b) storing an indication that the source code is eligible for express migration from a first code environment to a second code environment;
  c) receiving a code project identifier that identifies the code project;
  d) after receiving the code project identifier, determining, based on the code project identifier and the stored indication, that the source code is eligible for express migration from the first code environment to a second code environment;
  e) after determining that the source code is eligible for express migration from the first code environment to the second code environment, packaging the source code to create a code project package;
  f) after determining that the source code is eligible for express migration from the first code environment to the second code environment, storing the code project package on a first code environment server (e.g., automatically, without requiring user intervention to copy the code project package from one repository to another);
  g) generating an entry with a first status for the code project package in a code migration status database;
  h) after determining that the source code is eligible for express migration from the first code environment to the second code environment, transmitting the code project package from the first code environment server to a second code environment server associated with the second code environment (e.g., automatically, without requiring user intervention to copy the code project package from one repository to another);
  i) checking the code project package into the second code environment;
  j) after transmitting the code project package from the first code environment server to the second code environment server, updating the entry for the code project package with a second status; and
  k) transmitting an indication of the second status (e.g., to one or more users).

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
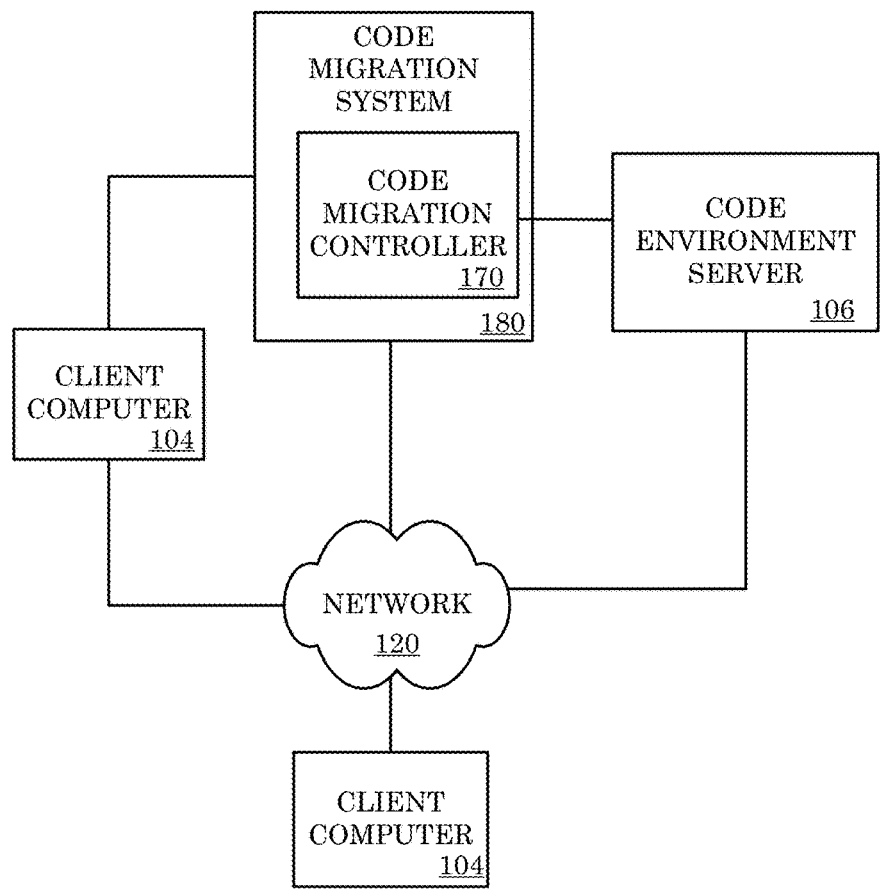
FIG. 1 is a block diagram of a system according to one or more embodiments.

In accordance with one or more embodiments described in this disclosure, a software application may be migrated from a first code environment, such as a software development environment, to one or more different target code environments. In one example, an application may be migrated from a development environment to at least one code testing environment (e.g., of a series of code testing environments, or of a plurality of parallel code testing environments). In another example, an application may be migrated from one code testing environment to at least one other code testing environment (e.g., in a series or sequence of code testing environments). In another example, an application may be migrated from a code testing environment to a production code environment.

The inventors have recognized that distributed development and maintenance provide unique challenges during the development process, testing of software, and integration of tested software into production environments, and that there is a need for code migration processes that limit the amount of human intervention required to qualify code for migration and/or to perform steps to transmit code and check the code into a new code environment.

According to some embodiments of the present invention, a code migration architecture and/or code certification process addresses issues associated with development and/or maintenance of software applications. Applicants have recognized that problems related to migration of software may be better approached by the establishment of and enforcement of eligibility criteria for an express migration process. According to some embodiments, enforcement may comprise an automated eligibility certification process to verify that application code conforms to the code migration system standards for an automated, express migration process.

According to some embodiments, each step in a code migration process may be itemized and transparent for audit review. In one example, an email containing a list of systematic handoffs, and indicating whether they were successful or not, may be automatically shared via email after the code migration service runs.

"Unit testing," as the term is used in this disclosure, refers to a testing method for testing individual units of source code. The scope of the individual unit may vary from coding project to coding project, but in general the unit will be the smallest testable portion of a given application or other software project. For example, in one case the smallest testable portion may be a specific function or called procedure. In other circumstances, the testable unit may be an interface, a specific object, or a specific class.

In accordance with some embodiments, the code migration architecture and/or code certification process allows for efficient scaling by reducing human interaction. Software development professionals (e.g., code developers and quality assurance (QA) team members) are able to move developed and unit-tested code to the next desired environment with no dependency on other personnel, manual methods, or manual processes. As a result, steps in prior art systems that cause delays and idle time for QA resources may be avoided.

According to some embodiments, a software application for controlling end-to-end code migration is sequenced programmatically and interfaces with one or more repositories storing a plurality of test cases (e.g., HP Quality Center), one or more repositories storing test execution results, one or more repositories for storing and managing operation data about data systems and applications (e.g., Enterprise Meta>Environment™ by Ab Initio), one or more application content databases (e.g., Teradata Database™ by Teradata Corporation, SharePoint™ by Microsoft Corporation) and one or more application project management databases (e.g., Project and Portfolio Management™ (PPM) by Hewlett Packard Enterprise (HPE)).

In some embodiments, the code migration architecture may be coded with intelligence to make decisions concerning whether to advance the migration based on, for example, test case execution, number of open defects, and/or adherence of code to pre-defined standards.

In one embodiment, a code migration process addresses these issues such as an automated check for eligibility, packaging of code, transmittal of code from one environment repository to another, and/or checking of the migrating code into a new code environment.

According to one example implementation, a code migration process with an express migration feature may comprise a software tool developed with a set of UNIX® scripts that reduce resource overhead by eliminating the need for human involvement and decision making and by migrating code between environments within very short time periods (e.g., a fraction of a second). According to the example implementation, UNIX scripts may be written for a code migration platform such as the Co>Operating System enterprise business application environment by Ab Initio Software LLC, and may have the ability to interact with multiple technologies. For instance, a set of tables may be created in an application content database (e.g., a Teradata Database™) to record information about every step of a migration process (e.g., for reporting purposes).

Further according to the example implementation, a job scheduling command may be executed (e.g., using an automated job control system such as CA Workload Automation AE (AutoSys® Edition) (commonly known as "AutoSys") by CA Technologies) by an application development professional to initiate a code migration process for a code project. The command job, in turn, initiates execution of a UNIX script on a development server, which checks for the project name on a predefined table list, which indicates whether the project is eligible for an express migration process or not. If the project is eligible for express migration, the script inserts a row into a database (e.g., a SharePoint database) and also tracks the status of migration on an audit table. The project is then packaged (e.g., using code package utilities by Ab Initio Software LLC) and a save file is created. This project is transmitted (e.g., using FTP) from the development server to a second server (e.g., a test server) without human interaction. The package is then checked into the code testing environment (e.g., the Enterprise Meta Environment by Ab Initio) of the test server (e.g., code management utilities by Ab Initio). After or in response to the code being loaded to a code repository, the code is then checked out for a batch process to run. The stored audit record may be updated as the status of the migration is complete. According to the example implementation, an email is sent detailing the time taken for the various steps to accomplish migration, and indicating if any issues were encountered in the process.

According to another example implementation, a process of code packaging and migration from a test environment to a production environment begins with a job scheduling command executed by an application development professional to initiate a code migration process for a code project. The command job, in turn, initiates execution of a UNIX script on a development server, which checks for the project name on a predefined table list, which indicates whether the project is eligible for an express migration process or not. If the project is eligible for express migration, the script inserts a row into a database (e.g., a Remedy code management database) and also tracks the status of migration on an audit table. The application is validated in a quality assurance application (e.g., HP's Quality Center) to make sure that all test cases have been run for the project before the migration process can move any further. The application is validated again to ensure that none of the defects are still open.

According to this example implementation, no new package is created. Instead, a package previously created in the development environment is transmitted from the test server to a production environment without requiring human interaction. The package is then checked into an environment of the production server (e.g., using Ab Initio utilities). After or upon the code being loaded to the repository, the code is then checked out for a batch process to run. The stored audit record may be updated as the status of the migration is complete. According to the example implementation, an email is sent detailing the time taken for the various steps to accomplish migration, and indicating if any issues were encountered in the process.

According to yet another example implementation, an express migration of code from a test environment to a production environment may begin with a check to determine whether the code is eligible for express migration. For instance, a user may request or initiate an express migration process using a user interface (e.g., by actuating a button or other user-selectable interface object, or typing in a command). The user enters or selects the name of the code project to be migrated, or includes the name in the request. In response to receiving the request, a code migration controller device accesses a database of code projects.

Various embodiments described in this disclosure provide for one or more types of improvements to the systems conventionally used in the software arts for managing the maintenance and development of software products, such as applications and other coding projects. Some embodiments advantageously eliminate wait times, migration delays, and interruptions, with low or no human intervention. One or more embodiments provide advantageously for an increased number of test cycles that may be executed in a testing environment as a result of time saved in code deployment to the testing environment. Some embodiments provide advantageously for the elimination of duplicate code packaging and technical repository creation, reducing resource allocation costs and redundant process steps.

FIG. 1 depicts a block diagram of an example system 100 for migrating code from one code environment to another code environment, according to some embodiments. Although reference may be made in this disclosure to examples of web applications and/or enterprise applications, it will be readily understood that disclosed embodiments may be useful with respect to various types of applications.

The system 100 may comprise one or more client computers 104 in communication with a code migration system 180 via a network 120. A code migration controller 170 is integrated into the code migration system 180, for example, as an embedded module, a portal, or other functionality accessible through and/or by the code migration system 180. In one embodiment, information stored by the code migration system 180 may be provided advantageously to the code migration controller 170 for code migration processing. For example, stored information about an application in development (e.g., source code, current status, eligibility for express migration) may be provided to or otherwise accessible by the code migration controller 170 without requiring manual input (e.g., from a user).

In some embodiments, the code migration system 180 may be hosted by a controller or server computer (e.g., a computer specially programmed to provide for one or more of the functions described in this disclosure). Typically a processor (e.g., one or more microprocessors, one or more microcontrollers, one or more digital signal processors) of a client computer 104 or a server computer will receive instructions (e.g., from a memory device or like device), and execute those instructions, thereby performing one or more processes defined by those instructions. Instructions may be embodied in, for example, one or more computer programs and/or one or more scripts.

In some embodiments the code migration system 180 and/or one or more of the client computers 104 stores and/or has access to data useful for facilitating code migration workflows. According to some embodiments, any or all of such data may be stored by or provided via one or more code environment servers 106 of system 100. A code environment server 106 may comprise, for example, an external computing system, a virtual computing environment, or a remote computer system for storing and serving data, such as test scheme data (e.g., for use in conducting one or more testing scenarios), or a combination of such remote and local data devices.

In some embodiments, the code migration system 180 may store some or all of the program instructions, and a client computer 104, such as a computer workstation or terminal of a user (e.g., a code developer or quality assurance (QA) professional), may execute the application remotely via the network 120, and/or download from the code migration system 180 (e.g., a web server) some or all of the program code for executing one or more of the various functions described in this disclosure. In some embodiments, a client computer 104 is used to execute an application, stored locally on the client computer 104, that accesses information stored on, or provided via, the code migration system 180, code environment server 106, one or more other client computers 104, and/or network 120.

In one embodiment, a server computer may not be necessary or desirable. For example, some embodiments described in this disclosure may be practiced on one or more devices without a central authority. In such an embodiment, any functions described in this disclosure as performed by a server computer and/or data described as stored on a server computer may instead be performed by or stored on one or more such devices. Additional ways of distributing information and program instructions among one or more client computers 104 and/or server computers will be readily understood by one skilled in the art upon contemplation of the present disclosure.

Figure 2:
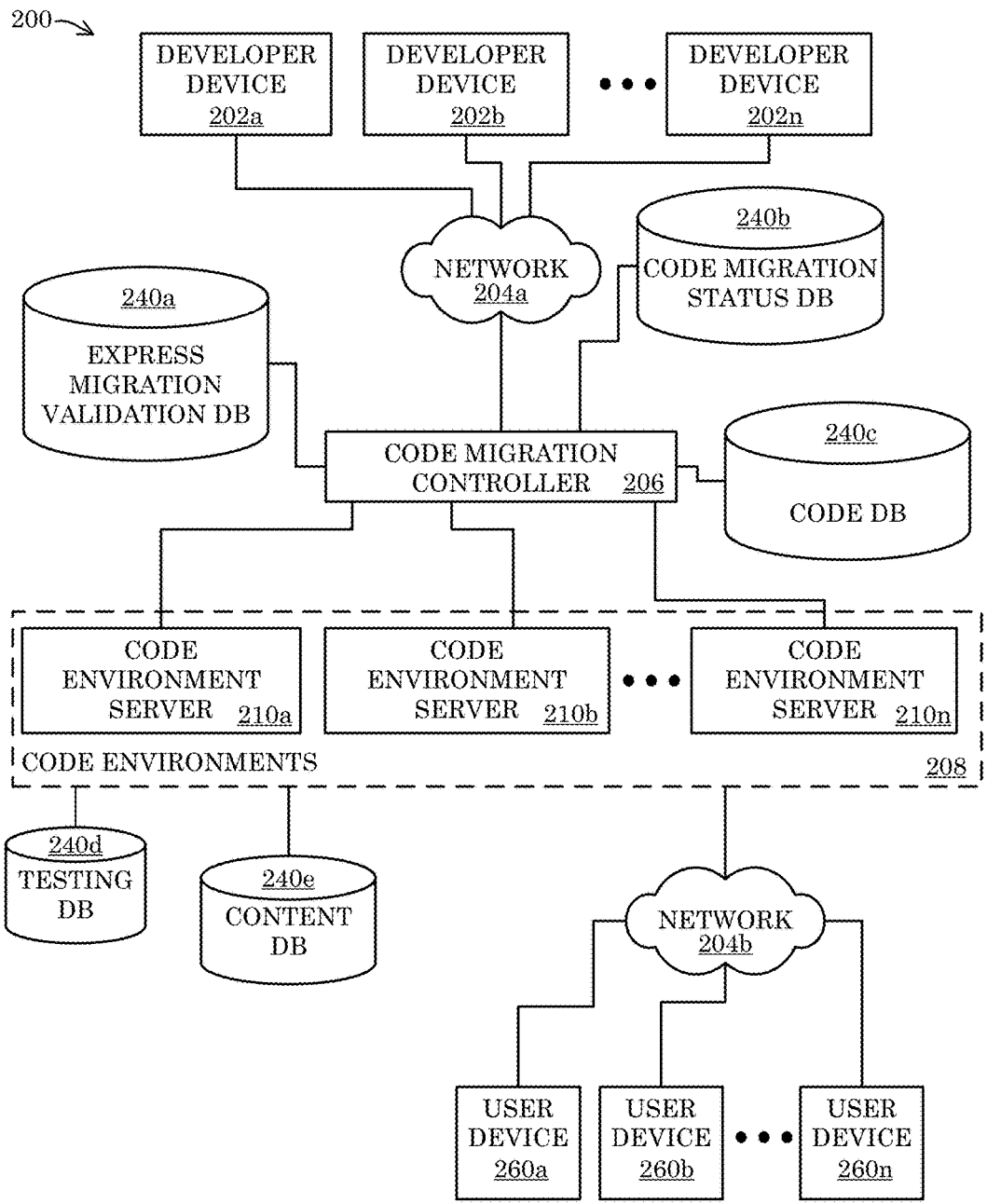
FIG. 2 is a block diagram of a system according to one or more embodiments.

Referring now to FIG. 2, a block diagram of a system 200 according to some embodiments is shown. In some embodiments, the system 200 may comprise a code migration platform. In some embodiments, the system 200 may comprise a plurality of developer devices 202*a-n*, networks 204*a-b*, and/or a code migration controller 206.

In some embodiments, one or more code environments 208 may be defined by a plurality of code environment servers 210*a-n*. In some embodiments, each of a plurality of available code environments 208 is associated with at least one corresponding environment server 210*a-n*.

As depicted in FIG. 2, any or all of the various components 202*a-n*, 204*a-b*, 206, 210*a-n*, and 260*a-n* may be in communication with and/or coupled to one or more databases 240*a-e*. The system 200 may comprise, for example, an express migration validation database (DB) 240*a*, a code migration status DB 240*b*, a code DB 240*c*, a testing DB 240*d*, and/or a content DB 240*e*.

According to some embodiments, any or all of the components 202*a-n*, 204*a-b*, 206, 210*a-n*, 240*a-e*, and 260*a-n* of the system 200 may be similar in configuration and/or functionality to any similarly named and/or numbered components described in this disclosure. Fewer or more components 202*a-n*, 204*a-b*, 206, 210*a-n*, 240*a-e*, and 260*a-n* (and/or portions thereof) and/or various configurations of the components 202*a-n*, 204*a-b*, 206, 210*a-n*, 240*a-e*, and 260*a-n* may be included in the system 200 without deviating from the scope of embodiments described in this disclosure. While multiple instances of some components are depicted, and while single instances of other components are depicted, for example, any component 202*a-n*, 204*a-b*, 206, 210*a-n*, 240*a-e*, and 260*a-n* depicted in the system 200 may comprise a single device, a combination of devices and/or components 202*a-n*, 204*a-b*, 206, 210*a-n*, 240*a-e*, and 260*a-n*, and/or a plurality of devices, as is or becomes desirable and/or practicable. Similarly, in some embodiments, one or more of the various components 202*a-n*, 204*a-b*, 206, 210*a-n*, 240*a-e*, and 260*a-n* may not be needed and/or desired in the system 200.

According to some embodiments, the developer devices 202*a-n* may be utilized by code development professionals to access (e.g., via the network 204*a* and/or one or more other networks not explicitly shown) functionality provided by code migration controller 206, various types of data provided by databases 240*a-e*, and/or code environment servers 210*a-n*. The code environment servers 210*a-n* may, for example, provide, manage, host, and/or conduct one or more various environments with respective purposes, such as development, testing, and/or production. In some embodiments, more than one environment may be implemented for the same purpose (e.g., two testing environments) and/or for more than one purpose (e.g., coding and testing). The various code environments 208 (virtual and/or physical) implemented using the code environment servers 210*a-n* may be configured to provide, manage, host, and/or conduct individual instances and/or sessions for code development, migration, and/or maintenance.

According to some embodiments, communications between the developer devices 202*a-n* and the code environment servers 210*a-n*, the code environments 208 and code environment servers 210*a-n*, and/or the databases 240*a-e* may be managed and/or facilitated by the code migration controller 206. The code migration controller 206 may, for example, receive commands and other types of communications from developer devices 202*a-n* and, in response, initiate an automated code migration process with an express migration feature.

In some embodiments, the code migration controller 206 and/or the networks 204*a-b* may comprise one or more proxy servers and/or devices (not shown in FIG. 2) via which communications between the developer devices 202*a-n* and the code environment servers 210*a-n* and/or communications between the user devices 260*a-n* are conducted and/or routed. In some embodiments, the proxy servers and/or devices may be located in one or more geographic areas and/or jurisdictions while the code environment servers 210*a-n* (and/or certain code environment servers 210*a-n* and/or groups of code environment servers 210*a-n*) are located in a separate and/or remote geographic area and/or jurisdiction.

In some embodiments, the code migration controller 206 may be in communication with the express migration validation DB 240*a*. According to some embodiments, the express migration validation DB 240*a* may comprise a dynamically-scalable database service (e.g., the DyanmoDB™ service provided by Amazon® Web Services, LLC). The express migration validation DB 240*a* may, for example, store information specific to one or more certain code projects, as established and identified by users using one or more of the developer devices 202*a-n*. In one example, a developer may establish a code project and indicate that the code project is eligible for express migration. During a code migration process (as described with respect to various embodiments in this disclosure) executed by the code migration controller 206, the code migration controller 206 may receive an indication of a code project (e.g., a code project ID that uniquely identifies a code project) and access the express migration validation DB to determine whether the code project is eligible for express migration.

In some embodiments, the code migration controller 206 may be in communication with the code migration status DB 240*b*. According to some embodiments, the code migration status DB 240*b* may comprise a dynamically-scalable database service. The code migration status DB 240*b* may, for example, store information specific to the status of a code project with respect to a code migration process. For example, one or more records may be stored in the code migration status DB 240*b* in association with a particular code project, with each record providing information about the past and/or current status of the migration of the code project from one environment to another and/or with respect to code testing. During a code migration process (as described with respect to various embodiments in this disclosure) executed by the code migration controller 206, the code migration controller 206 may store information about successes and/or failures in the code migration of one or more code projects, including code projects migrated using an express migration feature.

Some embodiments provide for receiving and/or storing source code (e.g., by a code migration controller 206) and/or packaging source code for migration from one environment to another, and storing the code package in a repository. In some embodiments, the code migration controller 206 may be in communication with the code DB 240*c* for receiving and/or storing source code and/or code packages associated with a code project.

Some embodiments provide for testing code associated with a project (e.g., automatically under the control of the code migration controller 206 and/or manually by one or more testers using user devices 260*a-n*). In some embodiments, the code migration controller 206 and/or code environment servers 210*a-n* may be in communication with the testing DB 240*d* for receiving and/or storing testing data source code and/or code packages associated with a code project.

According to some embodiments, the content DB 240*e* may comprise a data store of environment and/or application data suitable for testing, debugging, and/or live production purposes. The code migration controller 206, the developer devices 202*a-n*, the user devices 260*a-n*, and/or one or more of the code environment servers 210*a-n* may, for example, store data in the content DB 240*e* and/or may pull and/or retrieve data from the content DB 240*e*, as needed and/or desired for coding, testing, and/or production.

According to some embodiments, any or all of the developer devices 202*a-n* in conjunction with one or more of the code environment servers 210*a-n* and/or the databases 240*a-e* (e.g., via the network 204) may conduct (in whole or in part), facilitate, and/or otherwise be associated with execution of one or more stored procedures, applications, processes, and/or methods (and/or one or more portions and/or combinations thereof) as described in this disclosure.

According to some embodiments, processes described in this disclosure may be performed and/or implemented by and/or otherwise associated with one or more specialized and/or computerized processing devices, specialized computers, computer terminals, computer servers, computer systems and/or networks, and/or any combinations thereof (e.g., by one or more application developers and/or developer devices). In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, universal serial bus (USB) mass storage device, and/or digital video disk (DVD)) may store thereon instructions that when executed by a machine (such as a computerized processing device) result in performance according to any one or more of the embodiments described in this disclosure.

Figure 3:
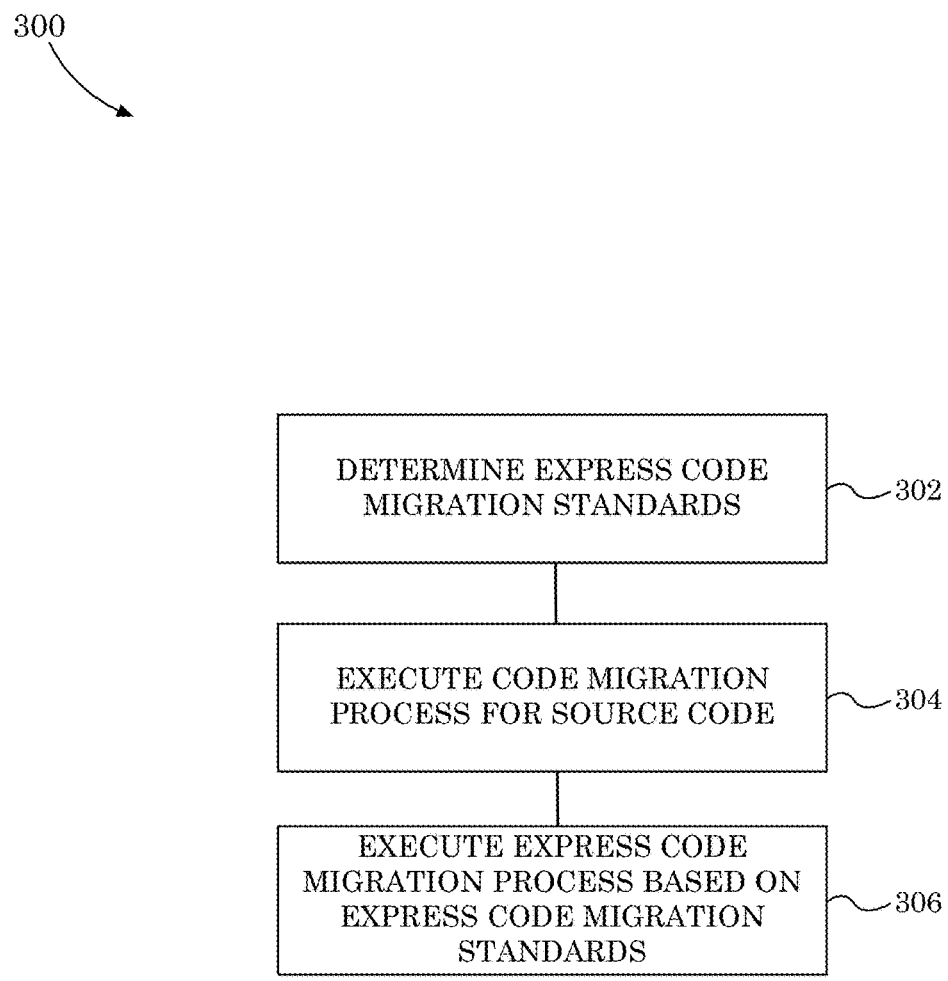
FIG. 3 is a flowchart of a method according to one or more embodiments.

Referring now to FIG. 3, a flow diagram of a method 300 according to some embodiments is shown. The method 300 may be performed, for example, by a server computer or controller device (e.g., of a code migration system). It should be noted that although some of the steps of method 300 may be described as being performed by a server computer (e.g., a code environment server), while other steps are described as being performed by another computing device (e.g., a code migration controller device), any or all of the steps may be performed by a single computing device, which may be a mobile device, desktop computer, or another computing device.

According to some embodiments, the method 300 may comprise determining one or more express code migration standards (e.g., accessing and/or receiving values, definitions, and/or predetermined requirements for determining whether a code project is eligible for express migration), at 302. In one embodiment, a migration controller may receive from a code development professional via a developer device one or more rules or criteria for defining whether a code project is eligible for express code migration. According to some embodiments, express code migration standards may be stored in a database (e.g., express migration validation DB 240a), and determining the standards may comprise accessing the database storing the standards.

The method 300 may further comprise executing a code migration process for source code, at 304, such as by initiating a process to migrate a code project (e.g., for a new application or changes to an existing application) from one environment to another. In some embodiments, the code migration process may be executed automatically (e.g., in accordance with a migration schedule). The method 300 may further comprise executing an express code migration process based on the express code migration standards, at 306. In one embodiment, the executing code migration process may automatically initiate a process to determine whether the source code is eligible for express code migration (e.g., by determining whether the code project is already determined to be eligible, such as by looking up a stored database record associated with the code project). In another embodiment, a code project that is eligible for express code migration (e.g., based on the express code migration standards) may be migrated in accordance with the express code migration process (e.g., automatically moving a code package from one code environment to another without human intervention). In some embodiments, a code migration process and/or an express code migration process may comprise outputting an indication of whether the migration of the source code was successful, an indication of whether the source code passes one or more testing and/or quality assurance standards, and/or forwarding a code project to one or more production environments and/or one or more testing environments.

Figure 4:
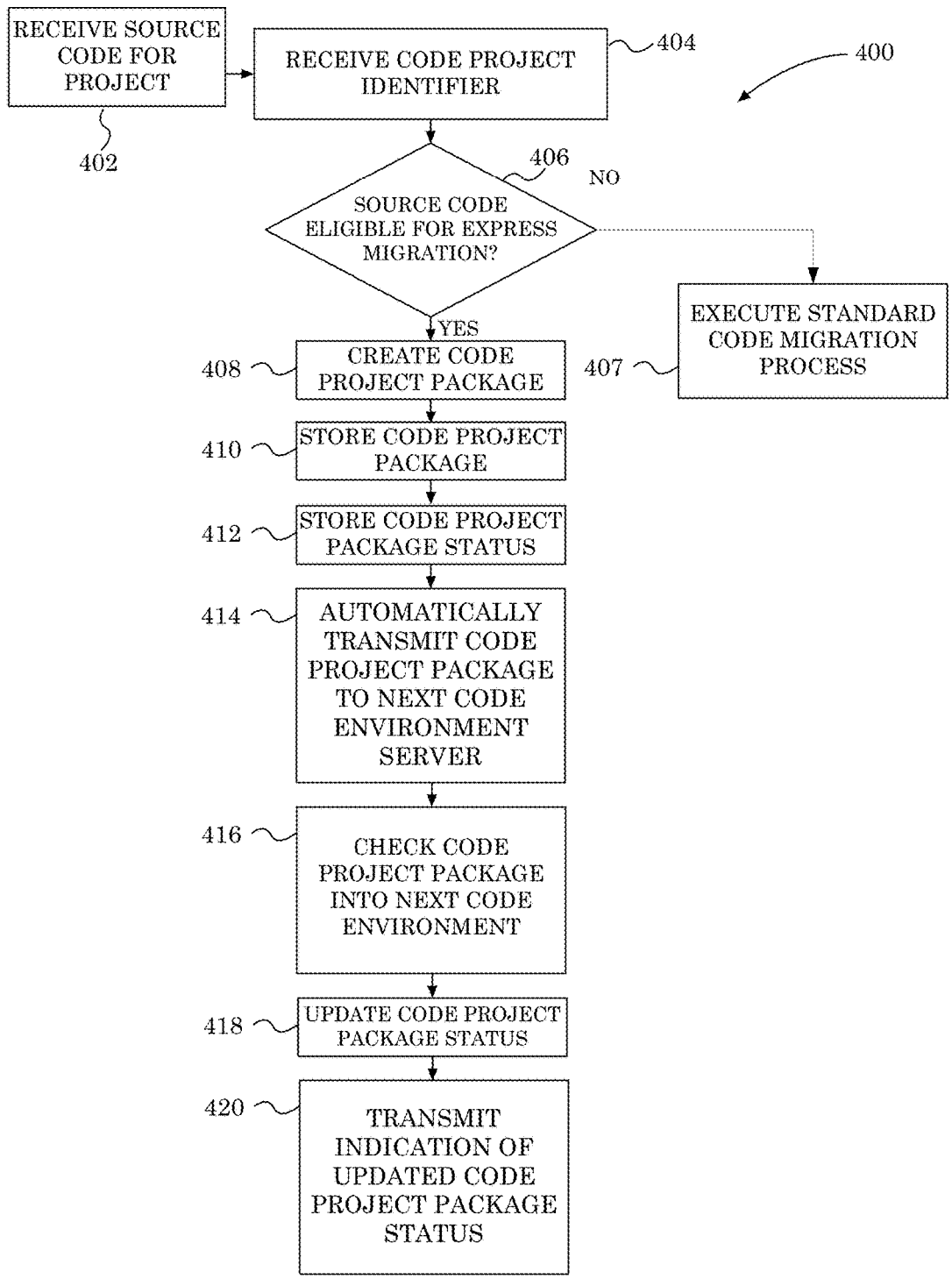
FIG. 4 is a flowchart of a method according to one or more embodiments.

Referring now to FIG. 4, a flow diagram of a method 400 according to some embodiments is shown. The method 400 may be performed, for example, by a code migration controller device (e.g., of a code migration system). It should be noted that although some of the steps of method 400 may be described as being performed by a code migration controller device while other steps are described as being performed by another computing device (e.g., a code environment server), any or all of the steps may be performed by a single specialized computing device, which may be embodied as a mobile device, desktop computer, or another computing device.

According to some embodiments, the method 400 may comprise receiving source code for a code project, at 402, and receiving a code project identifier that identifies a code project, at 404. For example, a development professional and/or a code migration platform upload source code (e.g., to code DB 240c) and may assign (e.g., manually via an interface, or automatically) an identifier to a code project that uniquely identifies the code project. In one embodiment, the identifier may be stored in a record in association with the received source code (e.g., in code DB 240c) and/or in association with code migration status information associated with the code project (e.g., in code migration status DB 240b).

According to some embodiments, the method 400 may comprise determining whether the source code for the project is eligible for express migration, at 406. In one embodiment, determining eligibility for an express code migration process may comprise comparing a received project code identifier to stored information associated with code projects (e.g., in express migration validation DB 240a), the information indicating eligibility (and/or ineligibility) for an express code migration process. If the source code for the code project is not eligible, the source code is processed in accordance with an executed standard code migration process, at 407.

If the source code is eligible, then a code project package is created for the code project, at 408, the code project package is stored (e.g., in code package data 544-1), at 410, and a code project package status is stored for the code project (e.g., in code migration status DB 240b), at 412. In some embodiments, the code project package is created automatically without requiring human input or intervention (e.g., in response to determining that the code project is eligible for express code migration).

According to some embodiments, the method 400 may comprise automatically transmitting the code project package to a code environment server (e.g., from one code environment server to the next, target code environment server), at 414. In one embodiment, the transmission of the code project package to the next code environment server (e.g., to a code testing environment server) may occur automatically without requiring human input or intervention (e.g., automatically in response to creating and/or storing the code project package in an express code migration process).

According to some embodiments, the method 400 may further comprise checking the code project package into the next code environment (e.g., one or more of code environment servers 210a-n), at 416, updating a code project package status for the code project package (e.g., in code migration status DB 240b), at 418, and transmitting an indication of the updated code project package status (e.g., by transmitting an email or other electronic message to a development professional associated with the code project), at 420.

Figure 5:
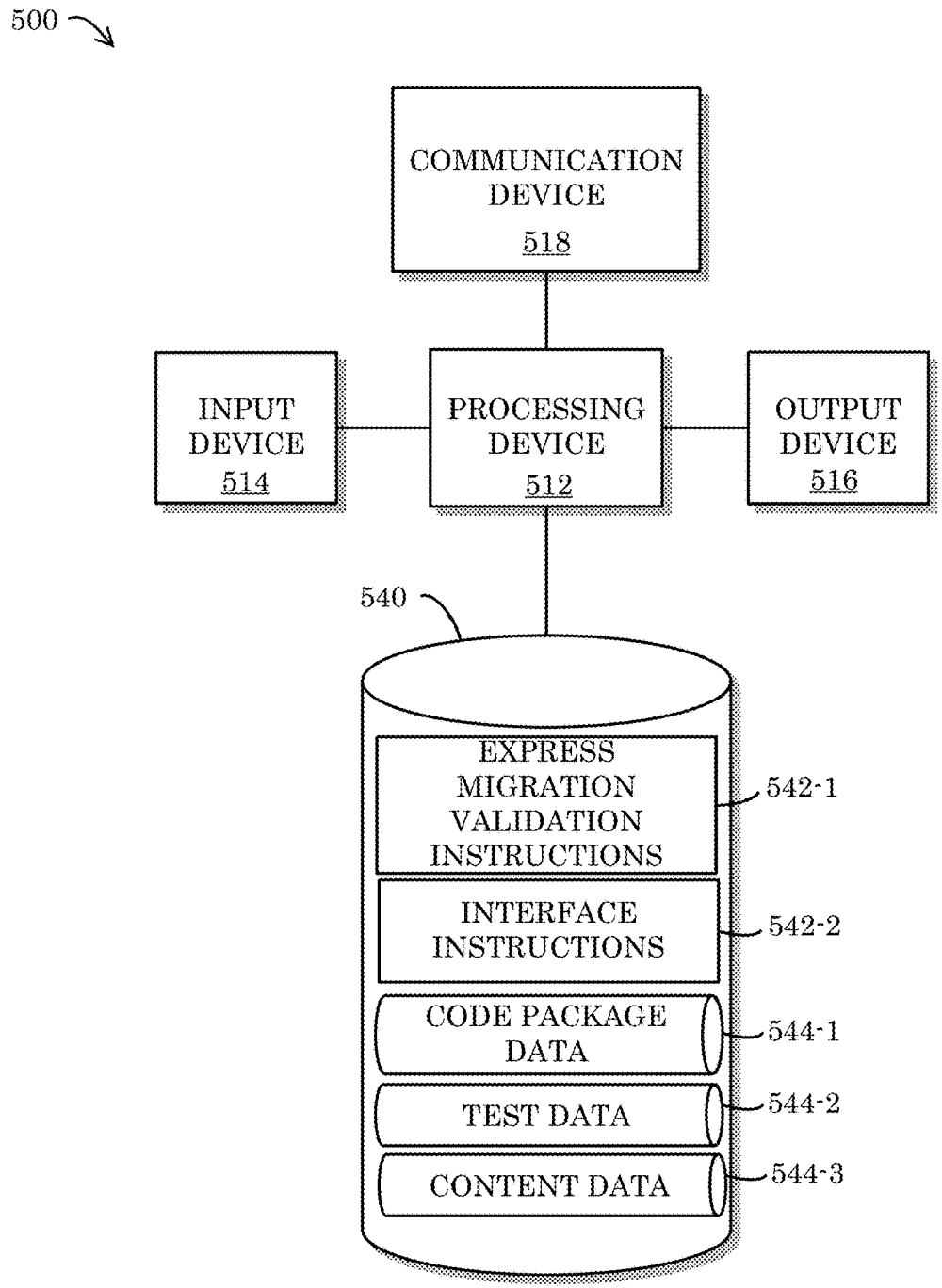
FIG. 5 is a diagram of a system according to one or more embodiments.

Turning to FIG. 5, a block diagram of an apparatus 500 according to some embodiments is shown. In some embodiments, the apparatus 500 may be similar in configuration and/or functionality to any of the code environment server 106, code migration controller 170, code migration controller 206, and/or code environment servers 210*a-n*, and/or may otherwise comprise a portion of the systems 100 and 200 described in this disclosure. The apparatus 500 may, for example, execute, process, facilitate, and/or otherwise be associated with the methods (e.g., express code migration processes) described in this disclosure.

In some embodiments, the apparatus 500 may comprise a processing device 512, an input device 514, an output device 516, a communication device 518, and/or a memory device 540. Fewer or more components 512, 514, 516, 518, 540 and/or various configurations of the components 512, 514, 516, 518, 540 may be included in the apparatus 500 without deviating from the scope of embodiments described in this disclosure.

According to some embodiments, the processing device 512 may be or include any type, quantity, and/or configuration of electronic and/or computerized processor that is or becomes known. The processing device 512 may comprise, for example, an Intel® IXP 2800 network processor or an Intel® XEON™ Processor coupled with an Intel® E7501 chipset. In some embodiments, the processing device 512 may comprise multiple inter-connected processors, microprocessors, and/or micro-engines. According to some embodiments, the processing device 512 (and/or the apparatus 500 and/or portions thereof) may be supplied power via a power supply (not shown) such as a battery, an alternating current (AC) source, a direct current (DC) source, an AC/DC adapter, solar cells, and/or an inertial generator. In the case that the apparatus 500 comprises a server such as a blade server, necessary power may be supplied via a standard AC outlet, power strip, surge protector, and/or uninterruptible power supply (UPS) device.

In some embodiments, the input device 514 and/or the output device 516 are communicatively coupled to the processing device 512 (e.g., via wired and/or wireless connections and/or pathways) and they may generally comprise any types or configurations of input and output components and/or devices that are or become known, respectively. The input device 514 may comprise, for example, a keyboard that allows an operator of the apparatus 500 to interface with the apparatus 500 (e.g., by a developer, such as to initiate a code migration process including an express code migration process as described in this disclosure). The output device 516 may, according to some embodiments, comprise a display screen and/or other practicable output component and/or device. The output device 516 may, for example, provide a code migration interface to a developer. According to some embodiments, the input device 514 and/or the output device 516 may comprise and/or be embodied in a single device such as a touch-screen monitor.

In some embodiments, the communication device 518 may comprise any type or configuration of communication device that is or becomes known or practicable. The communication device 518 may, for example, comprise a network interface card (NIC), a telephonic device, a cellular network device, a router, a hub, a modem, and/or a communications port or cable. In some embodiments, the communication device 518 may be coupled to provide data to a developer device and/or a user device (not shown in FIG. 5), such as in the case that the apparatus 500 is configured to provide an express code migration process for code maintenance as described this disclosure. In some embodiments, the communication device 518 may comprise an IR, RF, Bluetooth™, and/or Wi-Fi® network device coupled to facilitate communications between the processing device 512 and another device (such as a developer device and/or a user device).

According to the example embodiment for a specialized controller device depicted in FIG. 5, the memory device 540 may comprise any appropriate information storage device that is or becomes known or available, including, but not limited to, units and/or combinations of magnetic storage devices (e.g., a hard disk drive), optical storage devices, and/or semiconductor memory devices such as RAM devices, read only memory (ROM) devices, single data rate random access memory (SDR-RAM), double data rate random access memory (DDR-RAM), and/or programmable read only memory (PROM).

The memory device 540 may, according to some embodiments, store one or more of express migration validation instructions 542-1 and/or interface instructions 542-2. According to some embodiments, the memory device 540 may further comprise compiler instructions (not shown) for compiling source code (e.g., as part of a code migration process). In some embodiments, the express migration validation instructions 542-1 and/or interface instructions 542-2 may be utilized by the processing device 512 to provide output information via the output device 516 and/or the communication device 518.

According to some embodiments, express migration validation instructions 542-1 and/or interface instructions 542-2 may be operable to cause the processing device 512 to process code package data 544-1, test data 544-2, and/or content data 544-3. In some embodiments, the memory device 540 may further comprise, and/or apparatus 500 may have access to, express code migration standards (e.g., embodied in an express migration validation DB 240*a*) for determining (e.g., in accordance with the code package data 544-1) whether a code project is eligible for express code migration (e.g., from a test environment to a production environment). In one or more embodiments, code package data 544-1, test data 544-2, and/or content data 544-3 (and/or express code migration standards data) may be received, for example, via the input device 514 and/or the communication device 518 (e.g., from a developer, developer device, a user, and/or user device in a development, test, pre-production, or production environment).

In accordance with one or more embodiments, code package data 544-1 (e.g., source code defining one or more applications or other code projects) may, for example, be analyzed, parsed, scored, checked for compliance, and/or otherwise processed by the processing device 512, in accordance with the express migration validation instructions 542-1. In some embodiments, the code package data 544-1 is processed by the processing device 512 in accordance with the express migration validation instructions 542-1 to determine whether one or more code projects selected for code migration and specified by the code package data 544-1 conform to one or more defined express code migration standards (e.g., requirements, definitions, specifications, templates, or the like), such as may be defined, for example, in express migration validation data and/or express migration validation instructions 542-1. Code projects may be developed for use, for example, in an application development (pre-production) environment and/or platform production environment (and/or associated systems), such as for use in generating and/or updating one or more web applications (e.g., for an enterprise application platform).

In accordance with one or more embodiments, test data 544-2 and/or content data 544-3 may, for example, be analyzed and/or otherwise processed by the processing device 512, in accordance with the interface instructions 542-2 and/or one or more test schedules (e.g., for quality assurance testing of new or updated application code). As discussed in this disclosure, content data 544-3 may be utilized when executing and/or testing a code project.

According to some embodiments, compiler instructions (not shown) may be operable to cause the processing device 512 to compile source code of a code project, for example, to generate computer-executable software instructions (e.g., for web applications used in a testing and/or production environment).

In some embodiments, the interface instructions 542-2 may be operable to cause the processing device 512 to facilitate receiving code package data 544-1, test data 544-2, content data 544-3 (e.g., from a user and/or other computing device). In one or more embodiments, the interface instructions 542-2 may provide one or more user interfaces in accordance with embodiments described in this disclosure, such as, without limitation, displaying, or otherwise transmitting information about a code migration process and/or a status of a code project migration.

Any or all of the specialized instructions and data types described this disclosure and other practicable types of data may be stored in any number, type, and/or configuration of memory devices that is or becomes known. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the apparatus 500. According to some embodiments, the memory device 540 may be incorporated into and/or otherwise coupled to the apparatus 500 (e.g., as shown) or may simply be accessible to the apparatus 500 (e.g., externally located and/or situated).

One or more of various types of data storage devices may be used in accordance with one or more embodiments discussed in this disclosure. A data storage device may, for example, be utilized to store instructions and/or data, such as the instructions and/or data described in reference to one or more of the example computing devices in this disclosure. One or more types and/or combinations of data storage devices may generally store program instructions, code, and/or modules that, when executed by a processing device, cause a particular machine to function in accordance with one or more embodiments described in this disclosure. In some embodiments, instructions stored on a data storage device may, when executed by a processor (such as a processor device described in this disclosure with respect to one or more computing devices), cause the implementation of and/or facilitate the any of the methods, and/or portions or combinations of such methods, described in this disclosure. The following descriptions of some example types of data storage devices are representative of a class and/or subset of computer-readable media that are defined in this disclosure as "computer-readable memory" (e.g., non-transitory memory devices, as opposed to transmission devices or media).

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the data storage device and/or the data storage medium may be configured to store information utilizing one or more magnetic, inductive, and/or optical means (e.g., magnetic, inductive, and/or optical-encoding). The data storage medium may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes known or practicable. In some embodiments, a data storage device may comprise a USB keyfob, dongle, and/or other type of flash memory data storage device that is or becomes known or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable in this disclosure.

In some embodiments, one or more specialized machines such as a computerized processing device, a server, a remote terminal, and/or a user device may implement the various practices described in this disclosure.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "in this disclosure" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used in this disclosure is an area that conveys information to a viewer. The information may be dynamic, in which case, an LCD, LED, organic LED (OLED), CRT, digital light processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p, 4k, or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch-screen features or associated keypads as is well understood.

The present disclosure may refer to a "control system". A control system, as that term is used in this disclosure, may be a computer processor coupled with an operating system, device drivers, and appropriate programs (collectively "software") with instructions to provide the functionality described for the control system. The software is stored in an associated memory device (sometimes referred to as a computer readable medium).

A "processor" means any one or more microprocessors, central processing unit (CPU) devices, computing devices, microcontrollers, digital signal processors, or like devices.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described in this disclosure may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models, hierarchical electronic file structures, and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used in this disclosure, the term "network component" may refer to a user or network device, or a component, piece, portion, or combination of user or network devices. Examples of network components may include a static random access memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

In addition, some embodiments are associated with a "network" or a "communication network". As used in this disclosure, the terms "network" and "communication network" may be used interchangeably and may refer to an environment w in this disclosure one or more computing devices may communicate with one another, and/or to any object, entity, component, device, and/or any combination thereof that permits, facilitates, and/or otherwise contributes to or is associated with the transmission of messages, packets, signals, and/or other forms of information between and/or within one or more network devices. Such devices may communicate directly or indirectly, via a wired or wireless medium such as the Internet, LAN, WAN or Ethernet (or IEEE 802.3), Token Ring, or via any appropriate communications means or combination of communications means. In some embodiments, a network may include one or more wired and/or wireless networks operated in accordance with any communication standard or protocol that is or becomes known or practicable. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), the Fast Ethernet LAN transmission standard 802.3-2002® published by the Institute of Electrical and Electronics Engineers (IEEE), or the like. Networks may be or include a plurality of interconnected network devices. In some embodiments, networks may be hard-wired, wireless, virtual, neural, and/or any other configuration of type that is or becomes known. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

It will be readily apparent that the various methods and algorithms described in this disclosure may be implemented by, e.g., specially programmed computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A code migration controller device for managing code migration to a target code environment, comprising:
 a processor; and
 a computer-readable memory in communication with the processor, the computer-readable memory storing instructions that when executed by the processor direct the processor to:
  receive source code associated with a code project;
  store an indication indicating whether the source code is eligible for express migration;
  receive a code project identifier that identifies the code project;
  after receiving the code project identifier, determine, based on the code project identifier and the stored indication, whether the source code is eligible for express migration from a code development environment to a code testing environment;
  perform code migration of the code project,
   wherein performing the code migration of the code project comprises performing an express migration of the code project without user intervention, if the source code is eligible for express migration from the code development environment to the code testing environment; and wherein performing the code migration of the code project comprises performing a standard migration of the code project requiring user intervention, if the source code is not eligible for express migration from the code development environment to the code testing environment;

wherein performing the express migration of the code project without user intervention comprises:

after determining that the source code is eligible for express migration from the code development environment to the code testing environment, package the source code to create a code project package;

after determining that the source code is eligible for express migration from the code development environment to the code testing environment, automatically store the code project package without user intervention;

generate an entry with a first status for the code project package in a code migration status database;

after determining that the source code is eligible for express migration from the code development environment to the code testing environment, automatically transmit the code project package to the code testing environment server associated with the code testing environment without user intervention;

check the code project package into the code testing environment;

after transmitting the code project package to the code testing environment server, update the entry for the code project package with a second status;

transmit an indication of the second status;

after transmitting the code project package to the code testing environment server, receive the code project identifier;

determine, based on the code project identifier and the stored indication, that the source code is eligible for express migration without user intervention from the code testing environment to a target code environment;

determine that required test cases have been run for the code project;

after determining that required test cases have been run for the code project, validate the code project for migration from the code testing environment to the target code environment;

after validating the code project, transmit the code project package to a target code environment server associated with the target code environment without user intervention;

check the code project package into the target code environment;

after transmitting the code project package to the target code environment server, update the entry for the code project package with a third status;

transmit an indication of the third status;

wherein performing the standard migration of the code project with user intervention comprises:

receiving, after determining that the source code is not eligible for express migration from the code development environment to the code testing environment, an input from a user directing the processor to create a manually-initiated code project package;

wherein, for each step of the code migration, respective audit information is stored in an audit record of an audit table, the audit information comprising an indication of whether that step was successful or not and an indication of whether any issues were encountered during that step; and wherein the respective audit information for all steps of the code migration is transmitted automatically upon completion of the code migration.

2. The code migration controller device of claim 1, wherein the target code environment comprises a production code environment.

3. The code migration controller device of claim 1, wherein the target code environment comprises a second code testing environment.

4. The code migration controller device of claim 1, wherein transmitting the indication of the second status comprises transmitting an email to a user, the email including the indication of the second status.

5. The code migration controller device of claim 4, wherein the email further includes an indication of at least one issue encountered during migration from the code development environment to the code testing environment.

6. The code migration controller device of claim 1, wherein receiving the code project identifier that identifies the code project comprises receiving the code project identifier from a user.

7. A method of managing code migration to a target code environment, comprising:

receiving, by a code development environment server associated with a code development environment, source code associated with a code project;

storing, by the code development environment server, an indication indicating whether the source code is eligible for express migration;

receiving, by the code development environment server, a code project identifier that identifies the code project;

after receiving the code project identifier, determining, based on the code project identifier and the stored indication, whether the source code is eligible for express migration from the code development environment to a code testing environment;

performing code migration of the code project, wherein performing code migration of the code project comprises an express migration of the code project without user intervention, if the source code is eligible for express migration from the code development environment to the code testing environment; and wherein performing code migration of the code project comprises a standard migration of the code project requiring user intervention, if the source code is not eligible for express migration from the code development environment to the code testing environment;

wherein performing the express migration of the code project without user intervention comprises:

after determining that the source code is eligible for express migration from the code development environment to the code testing environment, packaging, by the code development environment server, the source code to create a code project package;

after determining that the source code is eligible for express migration from the code development environment to the code testing environment, automatically storing the code project package on the code development environment server without user intervention;

generating, by the code development environment server, an entry with a first status for the code project package in a code migration status database;

after determining that the source code is eligible for express migration from the code development environment to the code testing environment, automatically transmitting the code project package from the code development environment server to a code testing environment server associated with the code testing environment without user intervention;

checking the code project package into the code testing environment;

after transmitting the code project package from the code development environment server to the code testing environment server, updating, by the code development environment server, the entry for the code project package with a second status;

transmitting, by the code development environment server, an indication of the second status;

after transmitting the code project package from the code development environment server to the code testing environment server, receiving, by the code development environment server, the code project identifier;

determining, based on the code project identifier and the stored indication, that the source code is eligible for express migration without user intervention from the code testing environment to a target code environment;

determining that required test cases have been run for the code project;

after determining that required test cases have been run for the code project, validating the code project for migration from the code testing environment to the target code environment;

after validating the code project, transmitting the code project package from the code development environment server to a target code environment server associated with the target code environment without user intervention;

checking the code project package into the target code environment;

after transmitting the code project package from the code development environment server to the target code environment server, updating, by the code development environment server, the entry for the code project package with a third status; and transmitting, by the code development environment server, an indication of the third status;

wherein performing the manual migration of the code project with user intervention comprises:

receiving, after determining that the source code is not eligible for express migration from the code development environment to the code testing environment, an input from a user directing the processor to create a manually-initiated code project package;

wherein, for each step of the code migration, respective audit information is stored in an audit record of an audit table, the audit information comprising an indication of whether that step was successful or not and an indication of whether any issues were encountered during that step; and wherein the respective audit information for all steps of the code migration is transmitted automatically upon completion of the code migration.

8. The method of claim 7, wherein the target code environment comprises a production code environment.

9. The method of claim 7, wherein the target code environment comprises a second code testing environment.

10. The method of claim 7, wherein transmitting the indication of the second status comprises transmitting an email to a user, the email including the indication of the second status.

11. The method of claim 10, wherein the email further includes an indication of at least one issue encountered during migration from the code development environment to the code testing environment.

12. The method of claim 7, wherein receiving the code project identifier that identifies the code project comprises receiving the code project identifier from a user.

* * * * *